US007384339B2

(12) United States Patent
LeMay et al.

(10) Patent No.: US 7,384,339 B2
(45) **Date of Patent: *Jun. 10, 2008**

(54) FRAME CAPTURE OF ACTUAL GAME PLAY

(75) Inventors: Steven G. LeMay, Reno, NV (US); Dwayne R. Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 644 days.

This patent is subject to a terminal disclaimer.

(21) Appl. No.: 10/758,828

(22) Filed: Jan. 15, 2004

(65) Prior Publication Data

US 2004/0147314 A1 Jul. 29, 2004

(51) Int. Cl.
*A63F 13/00* (2006.01)

(52) U.S. Cl. .......................................... 463/30; 463/16

(58) Field of Classification Search .................. 463/24, 463/29, 34; 345/547–549
See application file for complete search history.

(56) References Cited

U.S. PATENT DOCUMENTS

| | | | | |
|---|---|---|---|---|
| 4,237,483 A | | 12/1980 | Clever | 348/150 |
| 4,521,014 A | | 6/1985 | Sitrick | 463/31 |
| 4,607,844 A | | 8/1986 | Fullerton | |
| 4,782,468 A | | 11/1988 | Jones et al. | |
| 4,948,138 A | | 8/1990 | Pease et al. | |
| 5,127,651 A | | 7/1992 | Okada | 345/835 |
| 5,175,731 A | * | 12/1992 | Suarez | 370/462 |
| 5,273,294 A | | 12/1993 | Amanai | |
| 5,395,242 A | | 3/1995 | Slye et al. | 463/1 |
| 5,643,086 A | | 7/1997 | Alcorn et al. | 463/29 |
| 5,702,303 A | | 12/1997 | Takemoto et al. | 463/16 |
| 5,761,647 A | | 6/1998 | Boushy | 705/10 |
| 5,770,533 A | | 6/1998 | Franchi | 463/42 |
| 5,810,665 A | * | 9/1998 | Takemoto et al. | 463/31 |
| 5,816,918 A | * | 10/1998 | Kelly et al. | 463/16 |
| 5,971,851 A | | 10/1999 | Pascal et al. | 345/629 |
| 5,997,401 A | | 12/1999 | Crawford | 273/143 R |
| 6,021,196 A | | 2/2000 | Sandford et al. | 463/27 |
| 6,104,815 A | | 8/2000 | Alcorn et al. | 380/251 |
| 6,106,396 A | | 8/2000 | Alcorn et al. | 463/29 |
| 6,110,043 A | * | 8/2000 | Olsen | 463/27 |
| 6,117,013 A | | 9/2000 | Eiba | |
| 6,149,522 A | | 11/2000 | Alcorn et al. | 463/29 |
| 6,224,485 B1 | | 5/2001 | Dickinson et al. | 434/307 A |
| 6,231,443 B1 | | 5/2001 | Asai et al. | 463/32 |
| 6,234,900 B1 | | 5/2001 | Cumbers | 463/29 |

(Continued)

OTHER PUBLICATIONS

International Search Report and Written Opinion dated Jun. 30, 2005 from corresponding PCT application US 2005/001063 (13 pages).

*Primary Examiner*—Ronald Laneau
*Assistant Examiner*—Benjamin W Lee
(74) *Attorney, Agent, or Firm*—Weaver Austin Villeneuve & Sampson LLP

(57) ABSTRACT

Methods and apparatus are described for capturing a game history. Execution of a game of chance is facilitated in a network causing generation of a plurality of game presentation frames capable of being presented on a multimedia display of a first device on the network. First frame data are received from the first device via the network. The first frame data represent at least a portion of the game history and include a selected one of the game presentation frames.

76 Claims, 9 Drawing Sheets

U.S. PATENT DOCUMENTS

| | | | | |
|---|---|---|---|---|
| 6,306,038 | B1 | 10/2001 | Graves et al. | |
| 6,319,125 | B1 | 11/2001 | Acres | 463/25 |
| 6,336,865 | B1 * | 1/2002 | Kinjo | 463/34 |
| 6,350,199 | B1 | 2/2002 | Williams et al. | 463/16 |
| 6,357,042 | B2 | 3/2002 | Srinivasan et al. | 463/16 |
| 6,421,738 | B1 | 7/2002 | Ratan et al. | 709/328 |
| 6,425,825 | B1 | 7/2002 | Sitrick | 463/31 |
| 6,435,969 | B1 | 8/2002 | Tanaka et al. | 463/44 |
| 6,438,696 | B1 | 8/2002 | Baran et al. | 712/202 |
| 6,446,119 | B1 | 9/2002 | Olah et al. | 709/224 |
| 6,533,662 | B2 | 3/2003 | Soltys et al. | 463/25 |
| 7,076,495 | B2 * | 7/2006 | Dutta et al. | 707/102 |
| 2001/0044337 | A1 | 11/2001 | Rowe et al. | |
| 2002/0111207 | A1 | 8/2002 | Lind et al. | |

* cited by examiner

FRAME CAPTURE OF ACTUAL GAME PLAY

RELATED APPLICATION DATA

The present application claims priority of U.S. patent application Ser. No. 09/689,498 for FRAME BUFFER CAPTURE OF ACTUAL GAME PLAY filed on Oct. 11, 2000, the entire disclosure of which is incorporated herein by reference for all purposes.

BACKGROUND OF THE INVENTION

This invention relates to game history preservation for gaming machines such as slot machines and video poker machines, as well as gaming applications operating in distributed computing and network environments such as the Internet. More particularly, the present invention relates to methods of capturing game screen information and critical game information for game history preservation.

As technology in the gaming industry progresses, the traditional mechanically driven reel slot machines are being replaced with electronic counterparts having CRT, LCD video displays or the like. These video/electronic gaming advancements enable the operation of more complex games, which would not otherwise be possible on mechanical-driven gaming machines. Gaming machines such as video slot machines and video poker machines are becoming increasingly popular. Part of the reason for their increased popularity is the nearly endless variety of games that can be implemented on gaming machines utilizing advanced electronic technology.

There are a wide variety of associated devices that can be connected to video gaming machines such as a video slot machines and video poker machines. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

For gaming machines, an important function is the ability to store and re-display historical game play information. The game history provided by the game history information assists in settling disputes concerning the results of game play. A dispute may occur, for instance, when a player believes an award for a game outcome was not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage on the gaming machine and displayed in some manner to a display on the gaming machine. The game history information is used to reconcile the dispute.

On video gaming machines such as video poker games or video slot games, a visual display of the game history typically has been used to settle such disputes. The visual display of the game history helps the game player disputing the results on the gaming machine to recall the actual results. Usually, only a subset of the game history is played backed and not the entire game. For example, for a video poker game, the visual display of information might include a graphical presentation of the initial cards dealt to the player, a graphical presentation of the cards drawn and a graphical presentation of the final hand. After the attendant and player visually review these results, the dispute may be settled.

The recall of the graphical presentation for game history playback has traditionally been achieved by retrieving critical game data from the non-volatile memory on the gaming machine and recreating an approximation of the graphical game presentation using a subset of the game code. For each game played on the gaming machine, critical game data stored in non-volatile storage may include the number of credits on the gaming machine when the game was initiated, the wager amount on the game, the paytable used to calculate the game outcome, the game outcome, image positioning information and any other information needed to recreate the visual game history. Often because of storage limitations of the non-volatile memory, a graphical presentation corresponding to the actual game play cannot be identically recreated and only a few specially selected visual portions of the game presentation are regenerated.

Now that gaming systems are becoming more powerful with enhanced graphical presentation capabilities, traditional methods of game history recreation are becoming more difficult to implement. Since the history playback is a recreation of the actual game play, many parts of the actual game code must be subsumed into a history playback code of some type to enable this function. Many newer game systems use graphical generation schemes employing mass storage devices that utilize varied load times and stream-able media formats to generate a game presentation. With these game systems, for efficiency, many game scenes are generated during the game play using 3-dimensional rendering and video playback capabilities where the exact final positioning/timing information of the game scenes are complex and not saved. The complex nature of the positioning/timing of modern graphical game presentations makes it difficult to store in a space limited non-volatile storage device. In addition, even if the information necessary to recreate the game presentation was recorded, the process to recreate the game presentation is very complex, time consuming and costly to re-engineer in a form different from the original game code.

At present, for any game with a unique game presentation, a unique history playback code is developed to recreate a visual display of the game history. For instance, for a first type of video slot game, a second type of video slot game with a game presentation different from the first video slot game and a video poker game, three distinct history play back codes are required. After development, the three playback codes must be separately approved by each gaming jurisdiction. The playback code development process and the playback code approval process are significant costs in the design of a new gaming machine.

The popularity of gaming on the Internet has also seen a dramatic increase in recent years. This includes gaming in which wagering on the outcomes of games of chance is facilitated. The need for outcome verification and validation in this setting is at least as great as for conventional gaming environments. However, conventional approaches to meeting this need suffer from many of the same drawbacks discussed above.

In view of the above, it would be desirable to provide method and apparatus that simplify the game history capture and playback process for game history preservation in a variety of gaming system environments.

SUMMARY OF THE INVENTION

The present invention addresses the needs indicated above by providing techniques for capturing and outputting game presentation and game history frames which correspond to actual frames of a game presentation on gaming machines and devices in network contexts. According to various embodiments, a wide variety of information may be incorporated into such game history frames. During game history playback, a frame playback code may be used to retrieve and display the game presentation frames and/or game history frames.

According to specific embodiments of the invention, methods and apparatus are provided for capturing a game history. Execution of a game of chance is facilitated in a network causing generation of a plurality of game presentation frames capable of being presented on a multimedia display of a first device on the network. First frame data are received from the first device via the network. The first frame data represent at least a portion of the game history and include a selected one of the game presentation frames. According to various embodiments, the game of chance is collaboratively executed with the first device.

According to some embodiments, capture of the selected game presentation frame on the first device involves selection of the selected game presentation frame from a frame buffer in the first device. According to others, capture of the selected game presentation frame involves capturing the selected game presentation frame directly from the display of the first device.

According to some embodiments, facilitating capture of the selected game presentation frame involves uploading at least one software module to the first device which is operable to capture the selected game presentation frame. According to others, facilitating capture of the selected game presentation frame comprises transmitting a capture command to the first device.

According to a specific embodiment, second frame data corresponding to the selected game presentation frame are independently generated for comparison to the first frame data. According to a more specific embodiment, the second frame data comprises a duplicate game presentation frame corresponding to the selected game presentation frame.

According to some embodiments, the first frame data correspond to a visual representation which includes the game presentation frame and is capable of being displayed on a multimedia display. This visual representation also includes a visible authentication object. According to more specific embodiments, the visible authentication object comprises at least one of date, time, serialized game number, paytable number, user id, machine serial number, current progressive values, host id, network id, and casino water mark.

According to other embodiments, a gaming system is provided which includes a plurality of gaming machines. Each gaming machine has a network interface and a master gaming controller operable to control a game of chance played on the gaming machine, to generate a sequence of game presentation frames for use in a video game presentation of the game of chance, to select one or more game presentation frames from the sequence of game presentation frames, and to incorporate frame data from the selected game presentation frames into one or more game history frames. Each gaming machine is also operable to receive cash or indicia of credit for a wager on the game of chance, and to output cash or an indicia of credit as an award for the game of chance. The gaming system includes a network interconnecting the plurality of gaming machines via the corresponding network interfaces, and at least one server coupled to the network and operable to store the game history frames from the plurality of gaming machines.

These and other features of the present invention will be presented in more detail in the following detailed description of the invention and the associated figures.

DESCRIPTION OF THE PREFERRED EMBODIMENTS

Figure 1A:
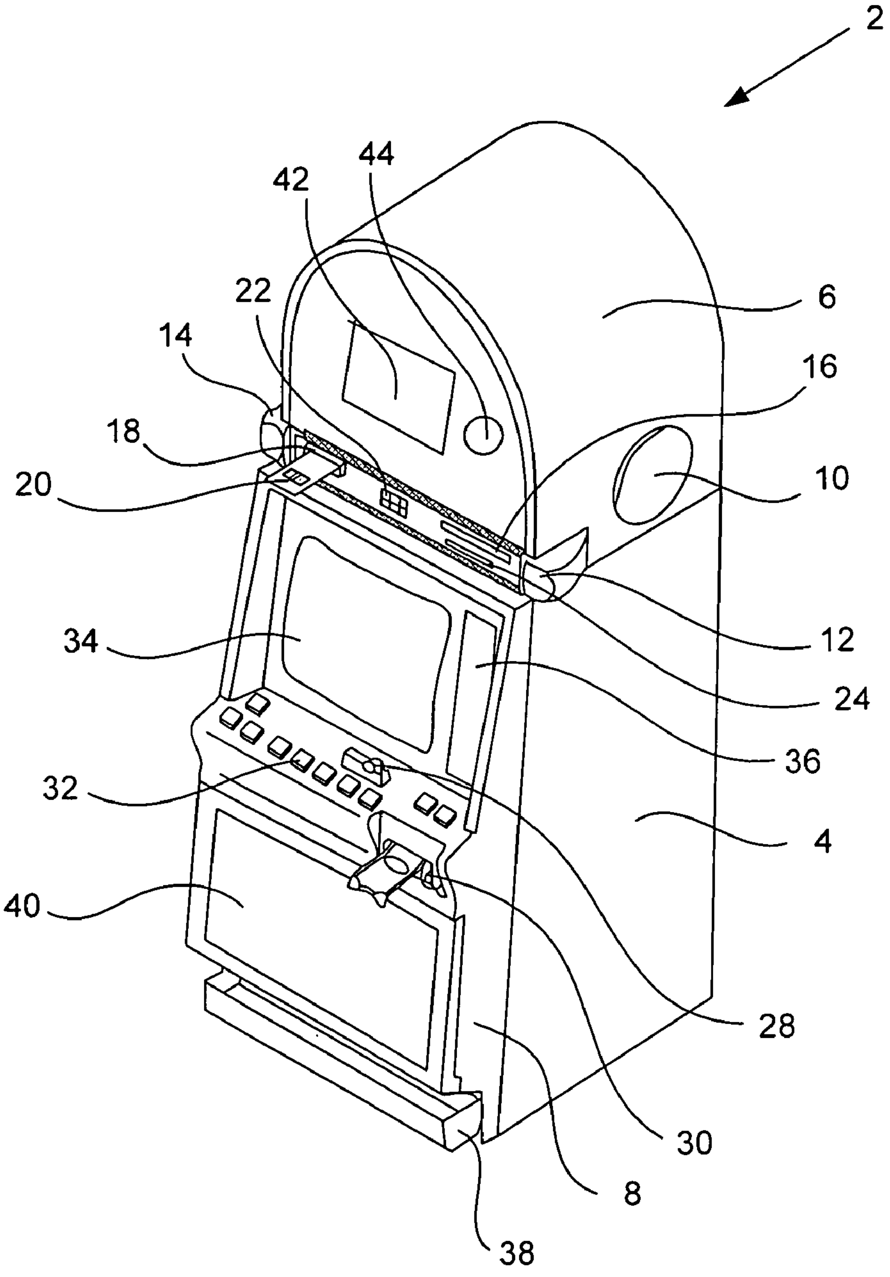
FIG. 1A is a perspective drawing of a gaming machine for one embodiment of this invention.

Turning first to FIG. 1A, a video gaming machine 2 for use with specific embodiments of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, plasma/LED display or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor.

Figure 2:
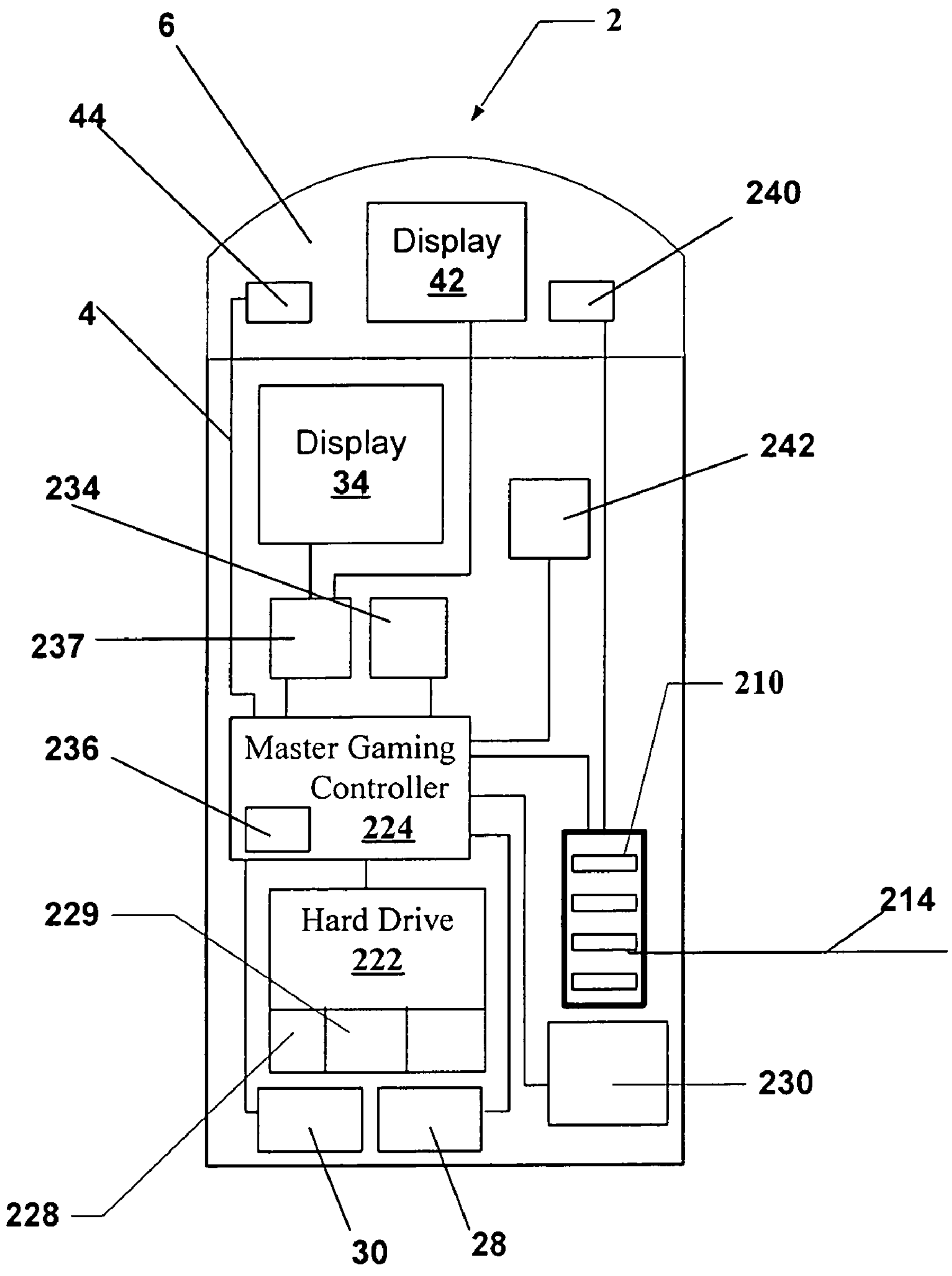
FIG. 2 is a block diagram of a gaming machine and gaming machine having a top box and other devices.

Typically, after a player has initiated a game on the gaming machine, the main display monitor 34 and the second display monitor 42 visually display a game presentation, including one or more bonus games, controlled by a master gaming controller 224 (see FIG. 2). The video component of the game presentation consists of a sequence of frames refreshed at a sufficient rate on at least one of the displays, 34 and 42, such that it appears as a continuous presentation to the player playing the game on the gaming machine. During the game presentation, select frames from the sequence of frames comprising the game presentation may be captured to a memory device located on the gaming machine. The captured frames provide a visual game history that may be utilized to settle disputes involving game play on the gaming machine.

Returning to the gaming machine in FIG. 1A, the information panel 36 may be a back-lit, silk screened glass panel with lettering to indicate general game information including, for example, the denomination of bills accepted by the gaming machine (e.g. $1, $20, and $100). The bill validator 30, player-input switches 32, video display monitor 34, and information panel are devices used to play a game on the game machine 2. The devices are controlled by the master gaming controller, housed inside the main cabinet 4 of the machine 2. During game play, information regarding the operation of one or more of these devices may be captured by the gaming machine as part of a game history on the gaming machine.

In the example, shown in FIG. 1A, the top box 6 houses a number of devices, which may be used to input player tracking information or other player identification information into the gaming machine 2, including the bill validator 30 which may read bar-coded tickets 20, a key pad 22, a florescent display 16, a camera 44 and a card reader 24 for entering a magnetic striped cards or smart cards. The camera 44 may be mounted in the top box 6 and used to record images of a player playing a game on the gaming machine. The key pad 22, the florescent display 16 and the card reader 24 may be used to enter and display player tracking information. In addition, other input devices besides those described above may be used to enter player identification information including a finger print recording device or a retina scanner.

Game history information from the input devices described above may be incorporated into a game history frame (see FIG. 1B) and/or stored as textual data. Further, the game history frame may include video data from the game presentation (e.g. one or more game presentation frames) and additional game information. For instance, a picture of the player playing the game during the game presentation and one or more frames of the game presentation captured during game play on the gaming machine may be incorporated into a game history frame. The game history frame with the player's picture may be utilized in a game dispute resolution and for promotional purposes.

In addition to the devices described above, the top box 6 may contain different or additional devices than those shown in the FIG. 1A. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. Those of skill in the art will understand that the present invention, as described below, can be deployed on most any gaming machine now available or hereafter developed.

Returning to the example of FIG. 1A, when a user selects a gaming machine 2, he or she inserts cash through the coin acceptor 28 or bill validator 30. Additionally, the bill validator may accept a printed ticket voucher which may be accepted by the bill validator 30 as an indicia of credit. Once cash or credit has been accepted by the gaming machine, it may be used to play a game on the gaming machine. Typically, the player may use all or part of the cash entered or credit into the gaming machine to make a wager on a game play. During the course of a game, a player may be required to make a number of decisions which affect the outcome of the game. For example, a player may vary his or her wager, select a prize, or make game-time decisions which affect the game play. These choices may be selected using the player-input switches 32, the main video display screen 34 or using some other device which enables a player to input information into the gaming machine including a key pad, a touch screen, a mouse, a joy stick, a microphone and a track ball.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. Typically, this type of information is not captured as part of an archived game history. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18 which may be incorporated into the one or more game history frames or saved in a textual record of the game history.

Figure 1B:
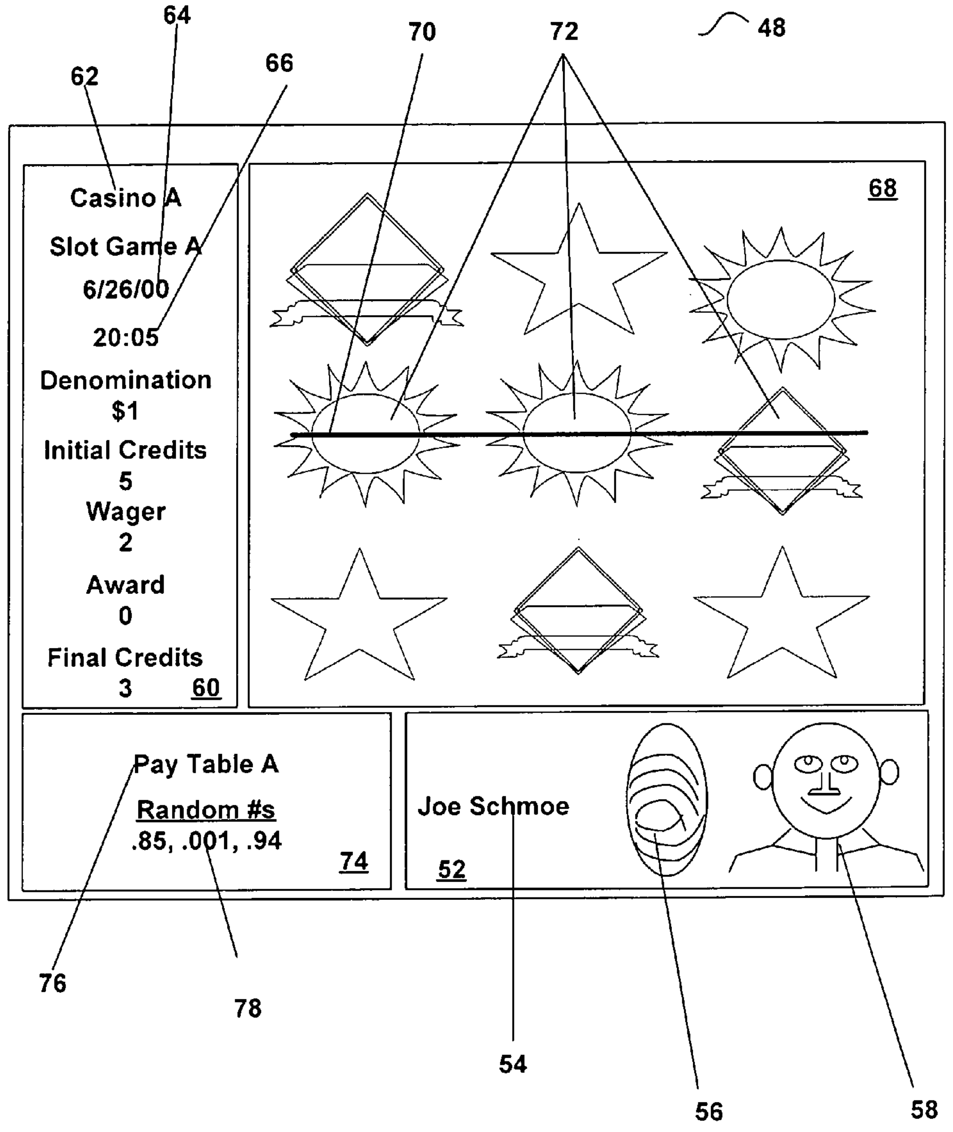
FIG. 1B is a block diagram of a game history frame.

FIG. 1B is a block diagram of a game history frame which may be displayed on at least one of the displays, 34 and 42, shown in FIG. 1A. In a specific embodiment, the game history frame 48 includes video data from a game presentation frame 68 selected from the sequence of game presentation frames in a video slot game presentation and additional game information. Besides the game presentation frame 68, the game history frame 48 includes game history information 60, game specific information 74 and player identification information 52. The selected game presentation frame 68 shows the final position of the "reels" in the video slot game presentation including three symbols (e.g. 72) on the payline 70. From the combination of symbols on the payline, a player may visually determine the outcome of the video slot game. Thus, when incorporated into the game history frame 48 and archived in some manner, the game presentation frame 68 may be used to provide a historical record of the game outcome.

In the game history frame 48, the game history information 60, game specific information 74 and player identification information 52 is rendered outside of the game presentation frame 68. In other embodiments, when the game presentation frame 68 is generated, parts or all of the game history information 60, game specific information 74 and the player identification information 52 may be directly rendered into the game presentation frame 68. A game presentation frame rendered with the additional information may be incorporated into the game history frame. In general, game history frames incorporating game presentation frames may be generated in many different formats and may include varying amounts of related information. For instance, a game history frame may include one or more game presentation frames. Further, a game history frame may be generated without any game history information, game specific information and player identification information or may be generated with various combinations of game history information, game specific information and player identification information.

During game play, game decisions made by a player may affect the outcome of the game and the subsequent game presentation. To provide a game history, game presentation frames and game history information representative of the player's game decisions may be captured by the gaming machine and incorporated into a game history frame. For example, in a video poker game, a number of cards are "dealt" to the player which appear as cards on the video display screen representing the initial hand. Based on the dealt cards in the initial hand, a player decides to hold or discard certain cards using one of the input mechanisms described above. The discarded cards are replaced by new cards. Based on the decisions by the game player, a series of hands may be displayed on the display screen to the player until a final hand is obtained. The final hand determines the game outcome and the award to the player.

As part of a game history, video data from game presentation frames representing the initial hand, intermediate hands (e.g. holds and discards) and final hand may be captured to one or more game history frames. For instance, a single game history frame may be generated that contains video data captured from 1) a game presentation frame displaying the initial hand, 2) a game presentation frame displaying an intermediate hand and 3) a game presentation frame displaying the final hand. Thus, the single game history frame would contain three game presentation frames. In another embodiment, three separate game history frames may be generated. including: 1) a game history frame containing video data captured from the initial hand, 2) a game history frame containing video data captured from the intermediate hand and 3) a game history frame containing video data captured from the final hand. As described above, each game history frame may also include additional information besides the captured video data including game history information, game specific information and player identification information. Although multiple game history frames may be generated to represent the game history of a single game where a single game history frame may contain video data from multiple game presentation frames, in FIG. 1B, only a single game history frame containing video data from a single game presentation frame from a video slot game presentation is shown.

Game history information, including a location, a date, a time, an amount wagered, an amount won, player tracking information, an amount lost, random numbers generated to produce the cards, a game pay table, a game name, a game denomination (e.g. 5 cents, 25 cents, 1 dollar, etc.) and game specific information (e.g. cards held, cards discarded) and the like, may also be incorporated into the game history frame. In the game history frame 48 in box 74, game specific information including a "pay table A" 76 and random numbers generated corresponding to the symbols 72 are displayed. In box 60, game history information including the location 62 where the gaming machine 2 resides, the type of game, the date 64 when the game was played, the time 66 when the game was played, the denomination of the game, the credits on the gaming machine when the game was initiated, the wager amount, the award made for the game and the credits on the gaming machine after the game is completed are shown. The rendering of game history information and game specific information into a game history frame is described with reference to FIGS. 2 and 3.

Player identification information 52 may also be rendered into a game history frame. For instance, in FIG. 1B, a player's name 54, finger print 56 and image 58 have been incorporated into the game history frame 48. The player's image may have been recorded with the camera 44. The player's name 54 may have been obtained when a player entered player tracking information into the gaming machine 2 using the card reader 24.

The game history information described above may be stored separately from the game history frame to provide a textual record of the game history. Typically, the textual game history information takes up significantly less memory than graphical game history information. Memory space is a consideration because of the amount of non-volatile memory space where the game history information is stored is usually limited. The textual record of the game history information provides another record of the game history which may be used in game disputes. Except when a game malfunction has occurred, the textual game history information and the graphical game history information stored on the game history frames will be consistent. For instance, an error in the game presentation code and/or a malfunction in the gaming machine hardware may produce an erroneous graphical game presentation which differs from the textual game history information stored in the gaming machine.

In the past, since a visual record of the game play was recreated from the textual game history information stored in the gaming machine, errors where the textual data and the graphical data are in disagreement were not necessarily reproduced in the recreation of the visual game presentation. For example, a hardware malfunction such as a power surge may cause an error in the graphical presentation but not affect the textual game history information stored in the gaming machine. When the graphical game history is generated from the textual game history information, the error may not be reproduced because the hardware malfunction is not reproduced. Thus, when graphical game history information is not captured, errors of this type may not be detected. With the present invention, this type of error may be detected because graphical game history information and a textual game history information from the actual game play are both captured and stored as part of a game history.

Many possible games, including video slot games, video poker, video pachinko, video black jack and video keno, may be provided with gaming machines of this invention. In general, the invention may be applied to any type of video game implemented on a gaming machine supporting video game presentations. Some gaming machines may provide multi-game capabilities where more than one type of game may be played on the gaming machine. For instance on the gaming machine 2, a player may select video black jack using the input buttons 32, make a wager, initiate a game and view a video black jack presentation on the display screen 34 and then select a video slot game, make a wager, initiate a game and view a video slot presentation. In this game play sequence, "game history frames" from the sequence of frames comprising the game presentations for the video black jack game and the video slot game are captured to a game history database. Typically, the game history database is stored in a non-volatile memory on the gaming machine. The storage of the game history frames in a game history database is described with reference to FIGS. 2, 3 and 5.

Using a single game history playback code on the master gaming controller that is independent of the type of game from which the game history frame was captured, a game history frame may be displayed from a video poker game, video slot game, video keno game, video pachinko game or any other video game played on the gaming machine (e.g., in the sequence above, a video black jack game and a video poker game). A single game history playback code, independent of the type of game, may be utilized for different types of games because one or more frames from the actual game presentation are identified and captured as game history frames in the present invention (e.g. the frame 68 of the video slot game presentation). In the past, critical portions of the visual game presentation were recreated using game history information saved while the game was executed because of limited non-volatile memory space. The recreation of the visual game presentation required portions of the code used to generate the unique game presentation for each type of game. With the present invention, the requirement to recreate the visual game presentation is eliminated because one or more frames from the actual game presentation are captured. Thus, a game history code that is independent of the type of game may be used.

Some advantages of capturing game history frames in the manner described above are that the visual record of the game history represented by the game history frame matches the actual presentation of the game play and may be displayed without a sophisticated game history regeneration code. In the past, the graphical game history was recreated from game history information stored during game play using a history regeneration code developed for each game. The regeneration code produced at best, a rough approximation of what may have occurred during game play.

In addition, a separate game history regeneration code had to be developed, tested and approved for each type of game as well as different implementations of the same game. For example, a different history regeneration code was needed for video black jack game versus a video slot game or two different video slot games required two different regeneration codes. By capturing game history frames, a game history playback code that is independent of the type of game or the implementation of the game may be used to display the visual game history represented by the game history frames because game specific code is not needed to regenerate the game presentation. Thus, the same playback code may be used for the video slot game and the video black jack game as well as for different of implementations of the same type of game. Thus, using the game history frame capture process, a more accurate record of the game play is recorded and significant engineering and approval time is saved in the game development process.

In FIGS. 1A and 1B, the frame capture process has primarily been described in the context of capturing game presentation frames displayed to a video display as part of a video game presentation. The invention described herein is not so limited. In general, for any type of gaming machine with video display capabilities, video data from any video frames generated by the gaming machine may be captured. The captured frames may have been generated for many purposes other than a video game presentation. For instance, frames from maintenance screens generated during maintenance on the gaming machine may be captured to provide a record of maintenance performed on the gaming machine. The video display may also be used to provide one or more game services to a player such as player tracking services, prize services, hotel services and accounting services. Video data from one or more video frames generated on the gaming machine while these gaming services are provided may also be captured by the gaming machine. For instance, when a player cashes out on a gaming machine after game play, information regarding the cash out process such as the amount of credits and the time of the cash out may be displayed on a display screen on the gaming machine. A frame containing the cash out information may be captured by the gaming machine. The captured frame may be sent to a printer to provide a record of the cash out process to the player. The frame capture process may also be utilized in other of other manners including 1) documents such as brochures and manuals that may be distributed with the gaming machine, 2) as part of testing and defect identification during gaming machine development and maintenance and 3) to capture frames that may be implemented as part of special graphics effects such as incorporating a players image into a game presentation.

FIG. 2 is a block diagram of a gaming machine having a top box, two displays and other devices in accordance with one embodiment of the present invention. Features that appear in both FIG. 1A and FIG. 2 are identified by common reference numerals. A master gaming controller 224 controls the operation of the various gaming devices and the game presentation on the gaming machine 2. Using a game code and graphic libraries stored on the gaming machine 2, the master gaming controller 224 generates a game presentation which is presented on the displays 34 and 42. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 236 located on the master gaming controller 224 or alternatively on the video controller 237. The gaming machine 2 may also include a video card (not shown) with a separate memory and processor for performing graphic functions on the gaming machine. Typically, the video memory 236 includes 1 or more frame buffers that store frame data that is sent by the video controller 237 to the display 34 or the display 42. In a preferred embodiment, the frame buffer is in video memory directly addressable by the video controller. The video memory and video controller are incorporated into a video card which is connected to the processor board containing the master gaming controller 224. The frame buffer may consist of RAM, VRAM, SRAM, SDRAM, etc. The memory size of each frame buffer is related to the resolution used on the video display and the number of colors used to render the presentation. The memory size of each frame buffer may be about 2 Megabytes or greater.

The frame data stored in the frame buffer provides pixel data (image data) specifying the pixels displayed on the display screen. In one embodiment, the video memory includes 3 frame buffers. The master gaming controller 224, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 237 to one or more of the displays. For instance, a frame corresponding to a movie stored on the game partition 228 of the hard drive 222, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2. A game history frame may include graphically rendered frames, streamed frames or combinations of both of these media formats.

During the game presentation, the master gaming controller 224 may select and capture certain frames to provide a game history. These decisions are made in accordance with particular game code executed by controller 224. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller.

After a game presentation frame is captured from a frame buffer, the master gaming controller renders all or part of the information stored in the frame buffer into a game history frame and copies the game history frame to one or more memory devices on the gaming machine such as the non-volatile memory 234, the hard drive 222 or other non-volatile mass storage for archival purposes. During the capture process, the game presentation frame data may be stored in an intermediate memory location on the gaming machine before it is copied, to the archival storage location. While in the intermediate memory location, the master gaming controller may operate on the captured frame data. For instance, to reduce the storage requirements, the number of colors in the game presentation frame may be reduced before the game presentation frame is rendered into the game history frame. The intermediate memory location may be a portion of the non-volatile memory or the system RAM. The non-volatile memory device may include battery-backed random access memory devices and flash memory devices. On the hard drive 222, the game history frame data may be stored in a history database partition 229. In one embodiment, game history frames providing visual records of the previous ten games are stored on the gaming machine.

In one embodiment of the invention, game history frames may also be stored and archived in locations outside of the gaming machine. In such embodiments, the gaming machine 2 transmits the game history frame to the outside location via a main communication board 210 and a communication connection 214 using an appropriate communication protocol stored on the gaming machine. Details of game history frame usage outside of the gaming machine are described with reference to FIG. 3.

During game play as described with reference to FIG. 1, the gaming machine may receive inputs from various devices installed within the main cabinet 4 and top box 6, including a card reader 240, a ticket acceptor 242, the bill validator 30, the coin acceptor 28 and the camera 44. The master gaming controller 224 may incorporate selected information received from these devices into the game history frame as game history information. In addition, the master gaming controller may separately store the game history information incorporated into the game history frame in one or more storage devices. As an example, prior to initiating a video slot game, the amount of money accepted from a bill validator or the ticket value/number for a ticket accepted by the ticket acceptor may be rendered by the master gaming controller on the game history frame displaying the final position of the reels in the video slot game (See FIG. 1B). In addition, this information may also be stored separately from the game history frame. This information may be stored as simple text for instance. As another example, an image recorded by the camera 44 of the player playing the video slot game at the time when the outcome of the video slot game is presented on the display 34 may be incorporated into the game history frame presenting the final position of the reels in the video slot game.

In general, any information input into the gaming machine, output from the gaming machine or generated by the gaming machine in the process of a game presentation may be incorporated into the game history frame. The type and amount of information incorporated into a game history frame is usually predetermined via game code executed by the gaming machine. Typically, a standard set of information may be recorded into the game history frame including "critical data" such as the amount wagered on the game, the credits on the machine, the amount of award, the amount of loss, the time, the date and the type of game. In addition, the information incorporated into the game history frame may vary according to the outcome of the game or other events occurring on the gaming machine as related to game play on the machine. For example, when the player is awarded a jackpot above a certain amount, a name and a picture of the player playing the gaming on the gaming machine may only be rendered into the game history frame.

Critical data may be incorporated into the game history frame in a number of ways including: 1) rendering the critical data directly into a game presentation frame prior to capture of the frame from the frame buffer, incorporating the modified game presentation frame into the game history frame and storing the game history frame, 2) rendering the critical data into the game presentation frame after capturing it from the frame buffer (e.g. while it is stored in intermediate storage), incorporating the modified game presentation frame into a game history frame and storing the game history frame, 3) incorporating a captured game presentation frame into a game history frame, rendering critical data around it, and storing the game history frame, 4) incorporating a captured game presentation frame into a game history frame, storing the game history frame and critical data separately, and when the critical data and the game history frame are recalled, rendering critical data around the game history frame 5) combinations of 1), 2), 3) and 4).

Figure 3:
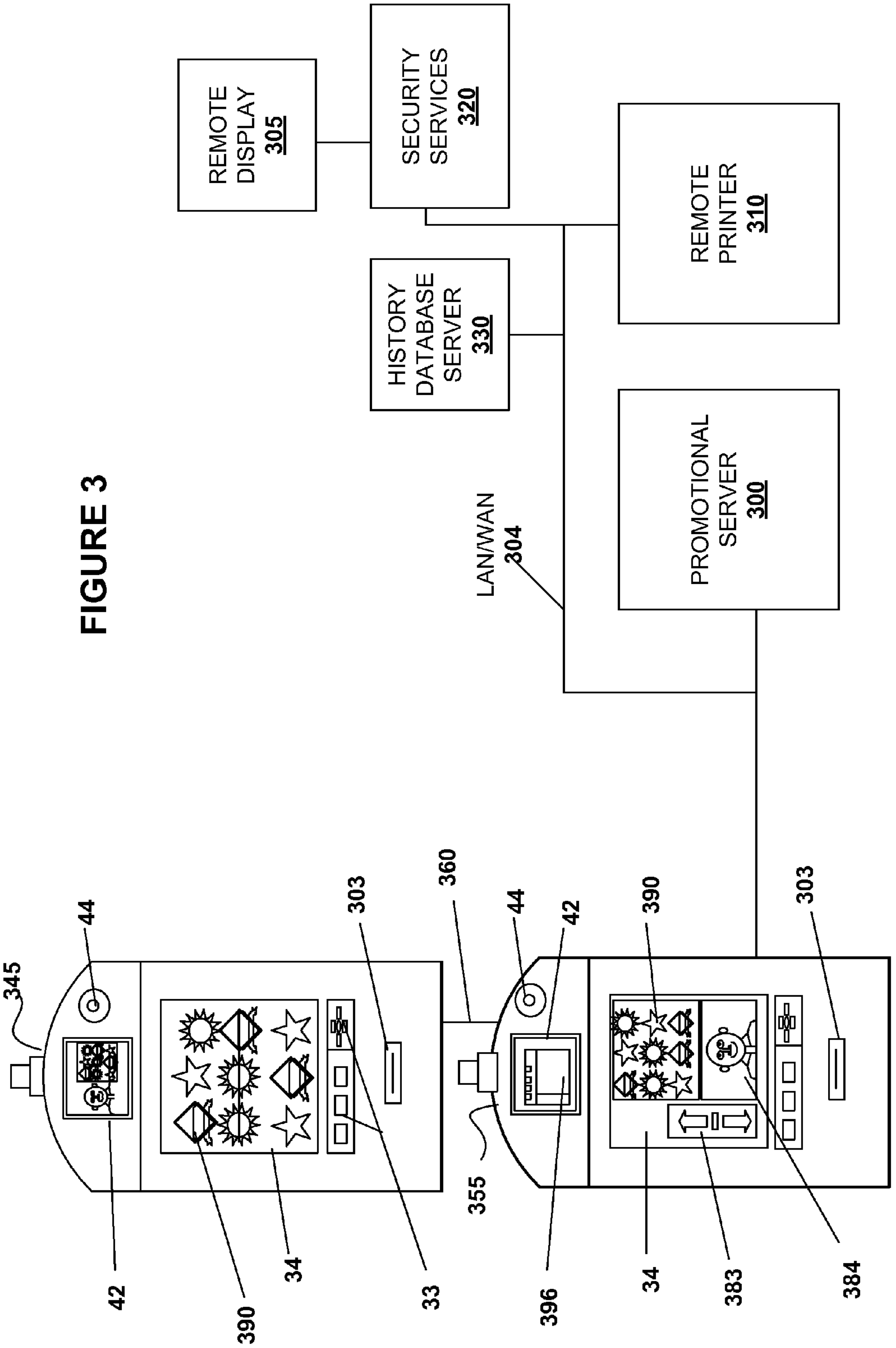
FIG. 3 is a block diagram of a gaming machine connected to a number of devices which may utilize captured game history frames.

The information incorporated into a game history frame may be affected in the gaming machine by commands sent to the gaming machine from a location outside of the gaming machine. Sometimes this is done for purposes unrelated to dispute resolution or security. For example, as part of an advertising promotion, the gaming machine may be instructed to capture a game history frame with the picture of the player playing the game on the gaming machine and print the frame using the printer 230. As shown in FIG. 3, the printer may also be in a location separate from the gaming machine. The game player receives the frame from the printer. Next, when the player whose picture is on the game history frame presents the frame at the casino where the game history frame was printed or some other casino, the printed game history frame may be exchanged for a promotional item. Further, the captured picture could also be displayed on other gaming machines to celebrate a win.

In another embodiment, captured and archived graphical and textual game history information may be incorporated into the game presentations and bonus game presentations of subsequent games. As an example, for a video slot game presentation, captured graphical information such as a player's image or game presentation frames from one or more previous games may be incorporated as video symbols in the video slot game. For instance, the image of the last player to win a jackpot on the machine may be incorporated into a jackpot symbol. When a new player wins the jackpot, their image may be incorporated into the jackpot symbol replacing the previous player's image or their image may be added as a new symbol. In one scenario, three symbols containing a player's face on a payline may trigger a jackpot or a bonus scenario. In yet another embodiment, various graphical information captured from previous game plays by the player may be incorporated as part of a bonus game scenario on the gaming machine. As a player play's consecutive games on the gaming machine, more and more information from their previous games are incorporated into the game presentation until a bonus scenario is triggered.

FIG. 3 is a block diagram of a gaming machine connected to a number of devices which may utilize captured game history frames. Two gaming machines, 345 and 355, with features described with reference to FIGS. 2 and 3, are connected together in a gaming machine loop 360 and to a Local Area Network (LAN) or Wide Area Network(WAN) 304. On the network 304, a number of devices are connected to the network including a promotional server 300, a history database server 330, a remote display 305, security services 320 and a remote printer 310. These devices may utilize and process game history information generated on the gaming machines 345 and 355.

On gaming machine 345, a promotional game history frame is displayed on the display 42. The promotional game history frame is a composite of the frame of the game presentation 390 on the main display 34 and a picture of the player playing the game recorded with the camera 44. The promotional game history frame may be printed to the printer 303. Also, the promotional game history frame may transmitted from the gaming machine to the promotional server 300 and the remote printer 310. The remote printer may print out a higher quality print than the printer 303. The promotional server may store and archive the promotional game history frame for later applications. For example, the promotional game history frame may be later mailed to the player with incentives to encourage a trip to a gaming location. The promotional game history frame may be incorporated as part of an advertisement in a general publication.

On a gaming machine 355, game history information is displayed in the context of the resolution of a game dispute. In the game dispute resolution process, an attendant will typically be called to the gaming machine. The attendant inserts a key in the side of the gaming machine that allows the gaming machine to be placed in a game history mode. In the game history mode, game history information relating to a number of past games played on the gaming machine may be recalled. For instance, the gaming machine may store game history frames relating to the past 10 games played on the gaming machine and game history information (e.g. textual data) relating to the past 100 games played on the gaming machine in a game history database (e.g. history database in partition 229 of FIG. 2). The game history frames are displayed to the display screen of the gaming machine 355 using the history playback code. The history playback code may consist of software instructions necessary to recall the game history frames from the game history database and display the game history frames to one of the gaming machine displays using the frame buffers and/or other video elements on the gaming machine.

Game history information may also be stored on the history database server 330 and accessed by the game history playback code. As described with reference to FIG. 2, when game history information including game history frames is stored in the non-volatile memory 234 of the gaming machine, it may be also be periodically transmitted to the history database server. The history database server 330 may contain a copy of the information stored on the gaming machine that may be used when data on the gaming machine has been lost or corrupted in some manner. In some embodiments, the history database server 330 may be used instead of non-volatile memory on the gaming machine to store the history database. To implement this embodiment, a fast data transmission rate between the gaming machine (e.g. 355) and the game history server 330 would likely be required.

Game history information archived in the manner described above may be redisplayed at the gaming machine where it was generated or on another remote system. The remote system may be another gaming machine or a video display attached to a personal computer. For instance, if the video display failed on a gaming machine, a game history for the gaming machine could be displayed on an adjacent gaming machine or the video display attached to the personal computer by accessing the game history server 330.

In another embodiment, archived game history information may be utilized in a current game presentation, bonus game presentation and a bonus game scenario. For instance, when a player initiates game play on a particular gaming machine, a record of game histories from previous games the player has played may be recalled from the game history server 330. The games may have been played on one or more gaming machines at various times in the past. Graphical information from previous games obtained from the game history server 330 may be incorporated into the game presentation of the current game being played on the gaming machine.

Textual game history information obtained from the game history server 330 may be used to develop a bonus game scenario and a bonus game presentation for the current game. For instance, game history records of one or more player's game play on various machines at different times may be obtained from the game history server and incorporated into a bonus game scenario. Thus, a bonus game event for the current game may be triggered from game events that occurred during previous game plays by the player on different gaming machines at different times. Further, as part of another bonus game scenario, graphical and textual game history information captured from previous game plays by a group of players may be incorporated into the game presentations of each player in the group and shared by the players.

In the game dispute resolution process, textual game history information may be displayed on the display screen 42 and the game history frame may be displayed on the main display 34. The touch screen controls 383 or player input switches 33 may be utilized to browse through different game history frames, including 390, corresponding to game histories from games stored on the gaming machine or archived in the history database 330. As described above, the game history frames may correspond to different types of games. Thus, a first game history frame may correspond to a video slot game, including 390, and a second game history frame may correspond to another video game including video poker, video pachinko, video black jack and video keno. The game history frame 390 may include a picture of the player 384 that was playing the game at the time of the game presentation or other player identification information such as player tracking information entered by the player. In addition, during the game dispute resolution process, the game history frame 390 and game history data 396 may be transmitted to security services 320 and viewed on the remote display 305. After locating and viewing the game history information, including the game history frames and textual game history data, the dispute between the game player and the casino is resolved and the gaming machine typically is restored to a game playing mode.

Figure 4:
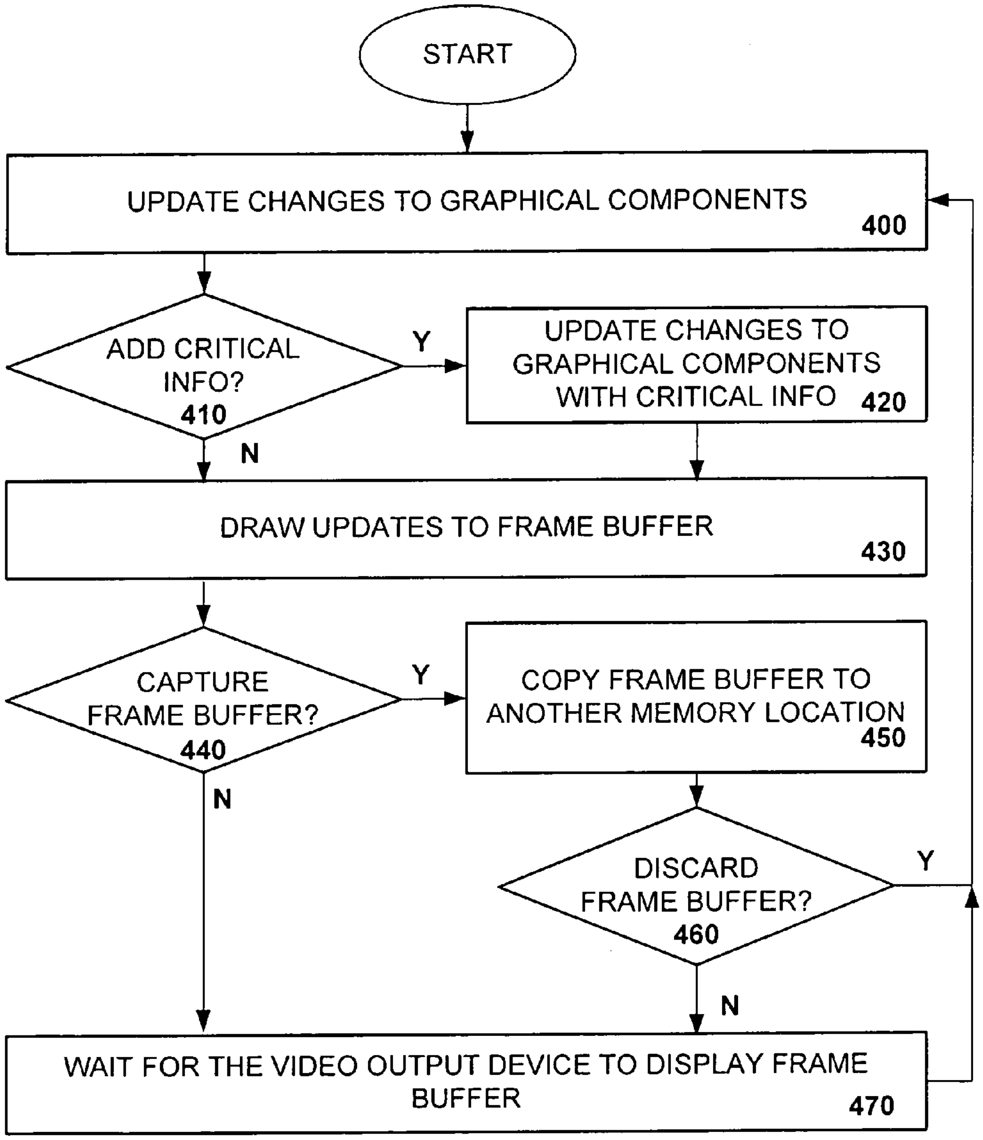
FIG. 4 is a flow chart depicting a method for capturing a game history frame from a frame buffer.

FIG. 4 is a flow chart depicting a method for analyzing a current frame and capturing it as a game history frame from a frame buffer for one embodiment of the present invention. In 400, the master gaming controller (See FIG. 2) updates changes to the graphical components of one the sequence of game presentation frames in the game presentation. In 410, the master gaming controller determines when game history information, such as the amount bet, the amount won/lost, the time and the date, may be added to the game presentation frame. As previously described, game history information may be archived with a game history frame in a number of manners besides directly rendering the game history information directly into the game presentation frame. In addition other frames generated in the operation of the gaming machine such as frames generated during maintenance of the gaming machine may also be captured. In 420, when game history information is to be added to the game presentation frame under consideration, the graphical components needed to incorporate the selected game history information into the game presentation frame are updated. For example, the graphical components needed to express a time and date on the game history frame using the image data comprising the frame may be generated. In 430, the frame buffer containing game presentation frame data is updated with the changes to the graphical components and if necessary with any added text per operation 420.

In 440, the master gaming controller (or other processing mechanism) determines when the game presentation frame stored in the frame buffer is to be captured. The determination may be based upon programming logic executed within the gaming machine or may be initiated from outside of the gaming machine. The captured game presentation frame is rendered in some manner into a game history frame. When the game presentation frame is unmodified, the captured game presentation frame becomes the game history frame. However, as described with reference to FIGS. 5 and 6, the game presentation frame may be processed before it is rendered into the game history frame.

In 450, when the frame buffer is to be captured, the game presentation frame data stored in the frame buffer is copied to a memory location. The memory location may be an intermediate location, such as a portion of the non-volatile memory 222 in FIG. 2, where the game history frame data may rendered into a game history frame before storage in non-volatile memory or the game presentation frame data may be copied directly to the non-volatile storage device without processing.

In 460, the machine determines whether contents stored in the frame buffer are to be discarded. When game history information is incorporated into the game history frame, it may be undesirable to display the game history frame to the player as part of the game presentation. When it is undesirable to display the game history frame to the player, the frame buffer may be discarded before it is rendered on the display device and a new frame may be drawn to the buffer in 400. Usually, the new frame in 400 will be similar to frame discarded (e.g. it may be identical to the frame discarded except that the game history information is not drawn on the frame). In 470, the video output device, which may include a video controller or a video card, displays the contents of the frame buffer to one or more of the display screens as part of the game presentation. When the frame buffer was captured as a game history frame and not discarded, the game history frame is substantially identical to one of the sequence of frames used in the game presentation.

Figure 5:
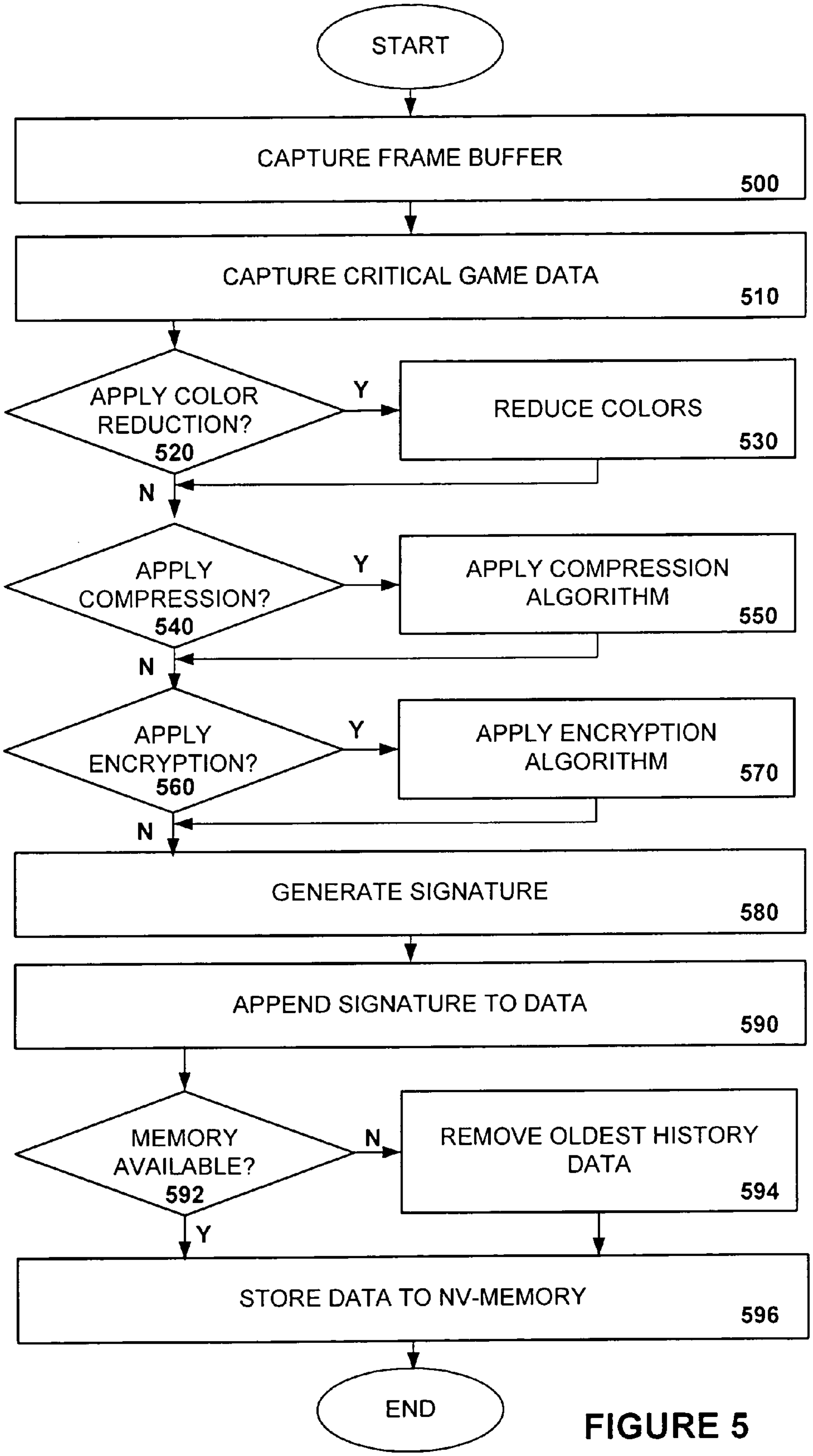
FIG. 5 is a flow chart depicting a method for storing a game history frame to a storage device.

FIG. 5 is a flow chart depicting a method for capturing and storing a game history frame to a storage device. This process may correspond to operation 450 in FIG. 4. In 500 and 510, the game history frame data and the critical game history information has been captured and copied to an intermediate memory location such as a portion of the non-volatile memory 234 in FIG. 2. The game history frame data may incorporate all or a subset of the critical game history information. In 520, the machine determines whether a color reduction algorithm should be applied to game history frame data to reduce the storage requirements of the game history frame. If so, the machine reduces colors at 530. For example, in 530, the number of colors may be reduced from 256 to 16 or the color scale may be reduced to gray scale. In 540, the master gaming controller determines if a compression algorithm should be applied to reduce the storage requirements with the non-volatile memory. If so, the compression algorithm is applied to the game history frame data in 550. In 560, the master gaming controller determines if encryption of the game history frame data should be applied. Encryption may be applied to prevent a fake game history frame from being utilized. In 570, the encryption algorithm is applied to the game history frame data. In some embodiments, one or more of the operations performed in 550, 560, and 570 may be eliminated or automatically applied. For example, compression may be applied by default, thus eliminating decision 540. Also, encryption may be applied by default thereby eliminating 560 and 570. These features may be added or removed without a dramatic impact to the existing game code.

In 580, a game history frame signature is generated that allows the game history frame data to be unambiguously identified. The game history frame signature may also be used to check the authenticity of the game history frame or determine whether the data in the frame has been corrupted. Checksum, hash value and CRC are a few examples of algorithms which may be used to generate the game history frame signature. One of these algorithms or combinations of these algorithms may be used to generate a frame history signature. For instance, when the Checksum algorithm is used, values of the bits comprising the game history data are summed to produce a number. The number becomes the game history frame signature. Typically, the game history frame signature is appended to the game history frame data (See 590). When the game history frame data is recalled from memory, a new Checksum value is calculated from the data. When the new Checksum value and the Checksum value stored with the frame match, the game history frame is identified as a valid frame.

In 592, the master gaming controller may determine the amount of memory available in the non-volatile memory and memory requirements of the game history frame and the game history information. In 594, when the memory requirements of the game history frame and the game history information exceed the memory available in non-volatile memory, the oldest history data may be removed from non-volatile memory. For instance, when game history frames from 10 previous games have been stored in non-volatile memory filling the available space, the one or more game history frames corresponding the first game added to non-volatile memory is removed so that the latest game history frame may be stored in the memory. In this procedure, it is assumed that the probability of dispute occurring decreases as the number of games played on the computer after the disputed game increases. As previously described, since game history information captured in 510 in a textual format usually requires less memory space than a game history frame, the number of games with game history information stored in a textual format may be greater than the number of games with game history frames (e.g. in a graphical format). Thus, graphical game history information may be discarded before the textual history data is discarded. Thus, when history data is recalled for a particular game where textual data exists but graphical data is unavailable, the recall page may display a message such as "picture no longer available".

In 596, the captured and potentially modified game history frame data is stored to the non-volatile memory. The non-volatile memory may reside on the gaming machine, the non-volatile memory may reside outside of the gaming machine or combinations of memory locations located both on and off the gaming machine may be used. The captured game history frame data may be stored in a variety of graphical formats including GIF, JPEG, BITMAP, etc.

Figure 6:
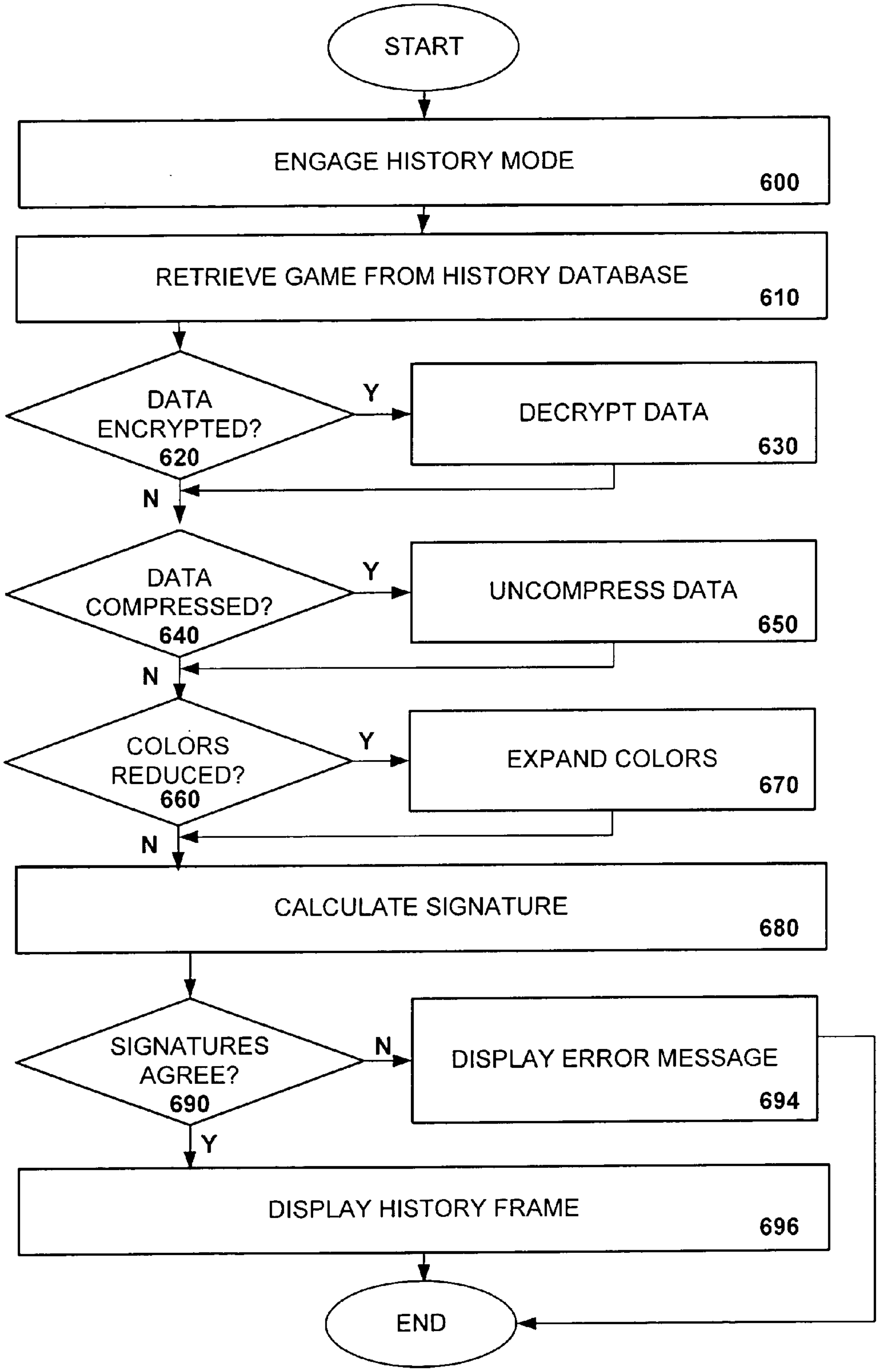
FIG. 6 is a flow chart depicting a method for game history playback using a game history frame.

FIG. 6 is a flow chart depicting a method for game history playback using a game history frame. In 600, during the dispute resolution process (described with reference to FIG. 3), the game history mode on the gaming machine is engaged. The game history mode may also be engaged for other reasons such as when the gaming machines appears to be malfunctioning. In 610, the game history or the game histories for one or more games may be retrieved. The game histories include at least one of captured game history frames and captured game history data. In 620, the master gaming controller determines whether the data contained in the frame is encrypted. When the data is encrypted, in 630, the data is decrypted. In 640, the master gaming controller determines whether the data contained in the frame is compressed. When the data is compressed, in 650, the data is uncompressed. In 660, the master gaming controller determines whether color reduction has been applied to the game history frame data. In 670, the colors may be expanded. However, since the original color data was lost in the color reduction process, the expanded colors may not match the colors utilized in the original game presentation. However, the information in the image may be substantially similar to the original game presentation frame presented on the gaming machine.

In 680, a game history frame signature is calculated from the game history frame data and compared to a previous game history frame signature incorporated into the game history frame data. For instance, a Checksum algorithm may be applied to all or a portion of the frame data. In 690, the signatures are compared. When the signatures do not agree, in 694, an error message is displayed to the display screen. In 696, when the game history frame signatures agree, the game history frame and related game history information is displayed to the display screen. The data may be displayed in a graphical format, a textual format or combinations of graphical and textual formats. The display process may involve copying the game history frame to a frame buffer which is accessible to the video controller on the gaming machine.

It should be understood that the present invention may be practiced in a wide variety of gaming system configurations. As mentioned above with reference to FIG. 3, gaming machines deployed in a WAN may work together with other network devices, e.g., a game history database server, to effect the capture and use of relevant game history information. More generally, any type of network in which gaming applications may be executed may take advantage of the present invention to capture game presentation and game history frame data for use as described herein. Examples of such embodiments will now be described with reference to the remaining figures.

Figure 7:
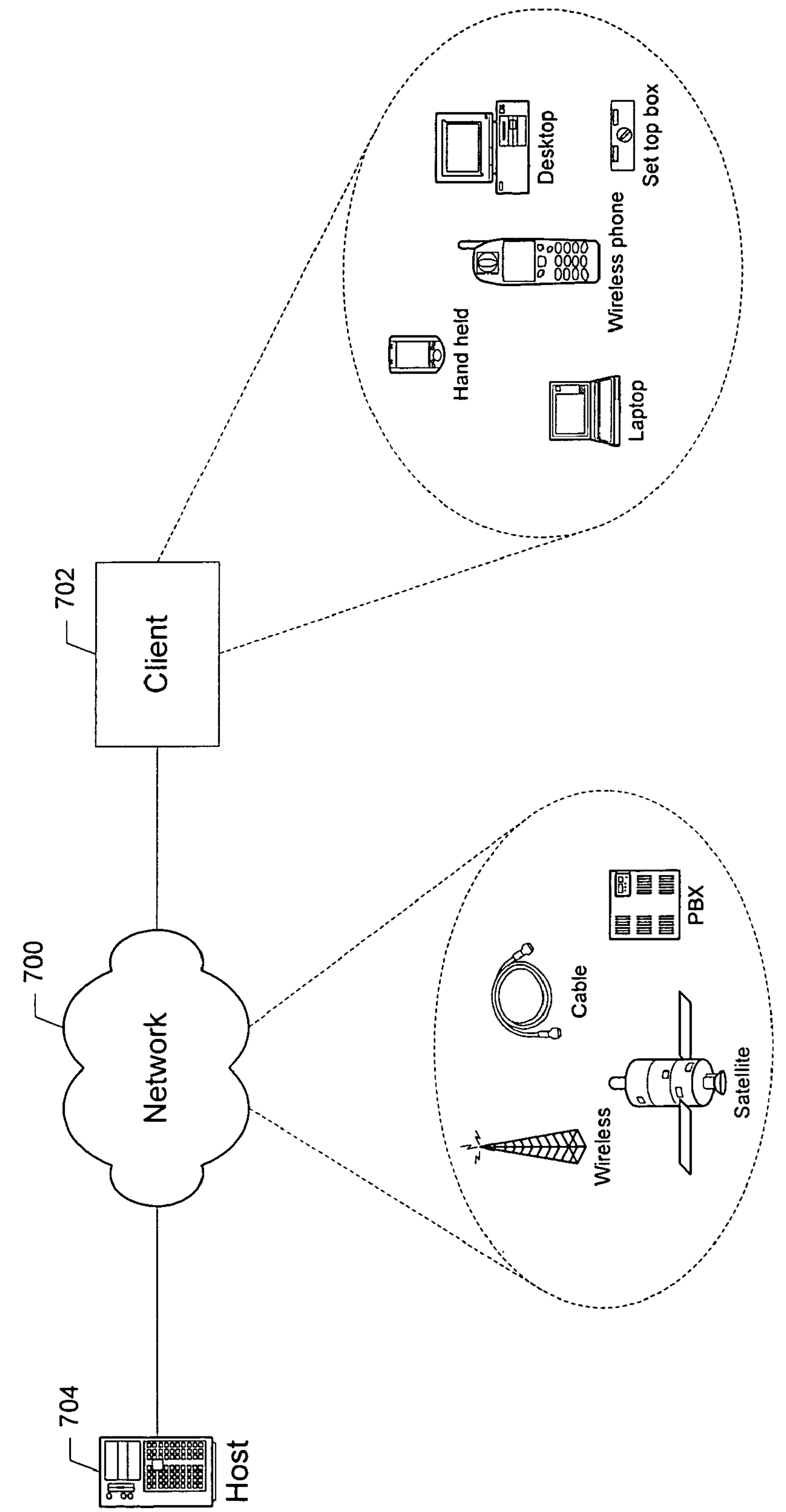
FIG. 7 is a simplified block diagram of a network environment in which a specific embodiment of the present invention may be implemented.

FIG. 7 is a simplified block diagram of a network environment in which embodiments of the present invention may be practiced. It should be understood that network 700 represents any of a wide variety of network topologies, only some of which correspond to the Internet and World Wide Web. For example, all or portions of network 700 may be implemented using any combination of public and private LANs or WANs which employ any of a wide variety of network communication protocols. In addition, all or portions of network 700 may be implemented using any of a wide variety of conventional or proprietary wireless, cable, or satellite network technology.

In the embodiment of FIG. 7, a client device 702 interacts with a host device 704 to effect execution of a gaming application which may comprise, for example, a game of chance. According to various embodiments, client device 702 may comprise any type of device having sufficient computing capabilities to enable a user to engage in gaming activity over a network. Examples of such devices include wireless phones, personal digital assistants, set top boxes, gaming consoles, desktop and laptop computers, etc. Client device 702 may also have varying levels of computational power, presenting the capabilities, for example, of a high powered work station or hand held thin client.

And unlike gaming machines 345 and 355 of FIG. 3, client device 702 does not operate independently to execute gaming applications and determine their outcomes. Rather, the outcomes (e.g., random number and pay table generation) are typically determined at host device 704 with the remainder of the computing load being distributed between devices 702 and 704. The manner in which this load is distributed depends on the gaming application architecture and/or the processing capabilities of client device 702.

That is, software architectures have moved toward an object oriented approach (e.g., Java and COM) where different software objects may be dynamically linked together prior to or during execution to create many different combinations of executables that perform different functions. Thus, the computing load can be distributed across multiple platforms according to their capabilities and/or the needs of a particular application. For example, according to some embodiments, most of the computing load (e.g., game logic and flow control) may be handled by host device 704, while client device 702 handles only game presentation functions, e.g., display and player feedback. Alternatively, some of the component modules relating to game logic and flow may reside and/or be executed on client device 702. In any case, it should be understood that the manner in which the computing load is divided is not central to the invention and should therefore not be considered as limiting the invention in any way.

Figure 8:
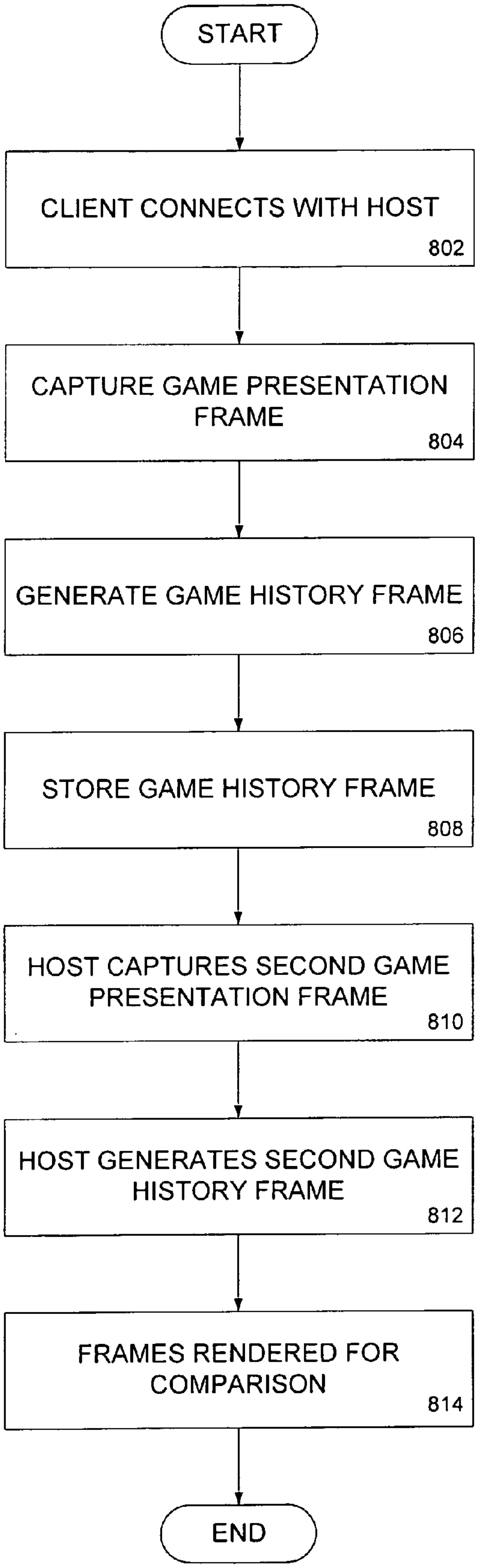
FIG. 8 is a flow chart illustrating frame capture in a network environment according to a specific embodiment of the invention.

A specific embodiment of the invention in which game history frames are captured in a network context is illustrated in the flowchart of FIG. 8. It will be understood that the details of such game history frames and the means by which they are captured may correspond to any combination of the corresponding details described above with reference to FIGS. 1-6. In addition, alternative approaches to at least some of these details may be apparent to those of skill in the art based on a particular network context and are therefore within the scope of the invention.

A user connects with a host device (e.g., 704) over a network using a client device (e.g., 702) for the purpose of participating in a gaming application (802). This connection may be achieved, for example, using the TCP/IP protocol. Alternatively, any suitable network communication protocol may be employed.

In the described embodiment, it is assumed that the logic which controls the generation of game presentation frames resides on the client device. This logic may operate as described above or use any available technology by which an image may be rendered on a computing or multimedia device. It is also assumed for illustrative purposes that the logic which controls the game flow and outcome generation resides on the host device. It will be understood, however, that the distribution of computing responsibilities between or among the network devices involved may vary considerably within the scope of the invention.

In response to some event, a corresponding game presentation frame displayed on the client device is captured (804). Such an event may correspond to a particular game outcome or state. According to various embodiments, the captured frame may be selected from a sequence of frames stored in a buffer, or taken directly from the screen of the client device. In alternative ones of these embodiments, the logic which detects the event and triggers the capture may reside on either of the client or host devices.

According to a particular embodiment, a game history frame (e.g., as shown in FIG. 1B) is then generated (806) which includes frame data corresponding to the game presentation frame and any of a variety of other data (e.g., critical game presentation data) as described herein. The game history frame may be generated at either the client device or the host device. In the latter case, the game presentation frame or even the entire frame buffer may be transmitted to host device. The game presentation frame and/or game history frame is then stored in memory associated with the host device (808).

In addition to any of the information described above which may be included in a game history frame, such frames may also include or have associated therewith information which uniquely identifies the frame in the particular network context in which it has been generated. For example, if the client and host devices have been communicating via a TCP connection which is uniquely identified by the combination of their respective network addresses, some portion of this information (e.g., the client address) may be associated with a game presentation frame to uniquely identify the frame. In general, any information relating to the network context, network communication protocol(s), and network devices themselves which can be employed to uniquely identify a game presentation or game history frame may be used to enable this aspect of the present invention.

Also in response to the event, the host device captures a game presentation frame corresponding to the one displayed and captured on the client device (810). According to specific embodiments, the host device generates its own version of the game presentation frame using its own game presentation logic which is substantially the same as the logic used by the client device to generate its game presentation frames. According to various ones of these embodiments, the host device may generate a complete or partial sequence of game presentation frames from among which it selects and captures the relevant frame. Alternatively, the host device may only generate the relevant frame in response to the occurrence of the event. A corresponding game history frame is then generated by the host device (812).

Regardless of how the game presentation or game history frames are generated, the two images may then be rendered by the host or an associated device (814) for any of a variety of purposes including, for example, verifying a particular outcome or resolving a dispute. According to a particular embodiment, the rendering and comparison of frames may be accomplished according to the process described above with reference to FIG. 6. However, the invention is not so limited, with any suitable alternatives and or modifications of the described process appropriate for the particular network environment being within the scope of the invention.

It should be understood that embodiments of the present invention are contemplated in which the host device does not necessarily generate a second version of a captured frame. That is, because the captured frame itself may be self-authenticating, it and various uses thereof may be considered to be within the scope of the invention. In addition, the captured frame may be compared with data which is not necessarily organized into a similar frame for any of the purposes described herein.

Embodiments of the invention implemented in distributed computing and network environments may include additional features to ensure secure communication between and among network devices, and to prevent unauthorized access to gaming application data. Such features are particularly important in the context of online gaming systems which incorporate wagering on game outcomes. In the context of the frame capture enabled by the present invention, it is important that the integrity of frame capture, transmission, and comparison be protected.

Therefore, according to a specific embodiment of the invention, the game presentation and game history frames may be generated in such a way so as to prevent or inhibit the unauthorized manipulation of the frames. For example, as described above with reference to FIG. 6, frame signatures (e.g., CRCs, checksums, or hashing functions) may be generated for the two frames to be compared such that the corruption or manipulation of data at the client or some intermediate device may be detected. In addition, encryption of any frame data to be transmitted over the network (e.g., using SSL) may further reduce the likelihood that such manipulation will occur.

According to a particular embodiment, game history frames may be generated such that they include some form of visual "watermark" which is indicative of the frame's authenticity. That is, when a game history frame is generated, an authenticating visual effect may be overlaid, embedded, or otherwise inserted into the frame as an indication of authenticity. Such a visual effect may be determined with reference to any of the components of the game presentation or game history frame including encrypted or hashed versions of those components. Alternatively, the visual effect employed may be determined with respect to some external parameter, e.g., the date or time.

Examples of such visual authentication objects may include, but are not limited to date and time, serialized game number, paytable number, user id, machine serial number, current progressive values, host id, network id, casino water mark, etc. According to various embodiment, the data corresponding to such authentication objects may be overlaid on top of the captured image, the image may be extended to include it, or binary data may be included in the data stream for the image and typically not displayed without a special software tool.

Although the foregoing invention has been described in some detail for purposes of clarity of understanding, it will be apparent that certain changes and modifications may be practiced within the scope of the appended claims. For instance, many different combinations of hashing algorithms, compression algorithms, color reduction algorithms may be applied to captured frame data. In addition, many different gaming system architectures may employ the various frame capture techniques described herein. Moreover, it should be understood that the client-server model described above with reference to FIGS. 7 and 8 is merely exemplary. The present invention is applicable to a variety of other network computing paradigms such as, for example, peer-to-peer computing.

It should also be understood that the information captured according to any of the embodiments of the invention may comprise more than just single game presentation frames or game history frames. That is, according to some embodiments, multiple game presentation frames may be captured or multiple game history frames may be generated for playback in a sequence (e.g., a movie) such that a chronological sequence of events which occurred on a gaming machine or client device may be replayed.

The ways in which such multiple frames may be captured, encoded, stored, transmitted, and replayed may also vary considerably and remain within the scope of the invention. For example, video frames on a gaming machine could be recorded using a video cassette or digital video disc recorder. In another example, game presentation frames on gaming machines or client or host devices may be captured, encoded, transmitted, stored, and played back according to any of a variety of digital recording standards such as, for example, any of the standards promulgated and/or developed by the Moving Picture Experts Group (MPEG).

In view of the foregoing, the scope of the invention should be determined with reference to the appended claims.

What is claimed is:

1. In a server device, a computer-implemented method for presenting captured game history for a game of chance played on a device, comprising:

facilitating execution of a game of chance on a first device in a network, the execution causing generation of a plurality of game presentation actual frames capable of being presented on a multimedia display of the first device in the network;

determining and/or receiving the outcome of the game of chance;

automatically detecting a game presentation capturing event corresponding to the outcome of the game of chance executing on the first device, wherein the game presentation capturing event effectively triggers capture of game presentation for the game of chance, and wherein the game presentation capturing event is automatically detected without input from a human;

facilitating capture of at least one selected game presentation actual frame from the plurality of the game presentation actual frames for the game of chance as generated when the game of chance is executed when the detecting detects the game presentation capturing event, wherein said selected game presentation actual frame is a frame generated and stored in a frame buffer of the first device for presentation on the multimedia display of the first device when said game of chance is executed on the first device in the network;

receiving first frame data from the first device via the network when the game of chance is executed, the first frame data representing at least a portion of the game history of the execution of the game of chance and including the selected game presentation actual frame;

storing the first frame data after receiving the first frame data on a computer readable medium; and displaying only the first frame data after the receiving of the first frame data, thereby effectively presenting the captured game history for the game of chance by displaying the selected game presentation actual frame.

2. The method of claim 1 wherein facilitating execution of the game of chance comprises receiving a request from the first device identifying the game of chance, and collaboratively executing the game of chance with the first device, wherein collaboratively executing the game of chance comprises executing the game of chance at least partly by a server device that communicates with the first device.

3. The method of claim 2 wherein collaboratively executing the game of chance comprises executing game flow logic on a host device, and executing game presentation logic on the first device.

4. The method of claim 1 wherein capture of the selected game presentation actual frame comprises capturing the selected game presentation actual frame directly from the display of the first device.

5. The method of claim 1 wherein facilitating capture of the selected game presentation actual frame comprises uploading at least one software module to the first device which is operable to capture the selected game presentation actual frame.

6. The method of claim 1 wherein facilitating capture of the selected game presentation actual frame comprises transmitting a capture command to the first device.

7. The method of claim 1 further comprising generating the first frame data.

8. The method of claim 7 wherein generating the first frame data comprises one or more of the following: compressing the selected game presentation actual frame, encrypting the selected game presentation actual frame, and reducing color information in the game presentation actual frame.

9. The method of claim 7 wherein generating the first frame data comprises capturing additional data and associating the additional data with the selected game presentation actual frame.

10. The method of claim 9 wherein the additional data include any of an amount wagered, game credits, an amount won, an amount lost, a time, a date, a game name, a location, player tracking information, random numbers generated, a game pay table, a game denomination, a first device identifier, and player identification information.

11. The method of claim 1 further comprising rendering the first frame data.

12. The method of claim 11 wherein rendering the first frame data comprises generating a visual representation of the first frame data which includes the game presentation actual frame.

13. The method of claim 1 further comprising independently generating second frame data corresponding to the selected game presentation actual frame.

14. The method of claim 13 further comprising comparing the first frame data with the second frame data.

15. The method of claim 14 wherein comparing the first frame data with the second frame data comprises rendering visual representations of the first frame data and the second frame data, respectively.

16. The method of claim 13 wherein the second frame data comprises a duplicate game presentation actual frame corresponding to the selected game presentation actual frame.

17. The method of claim 16 wherein the second frame data further comprises any of an amount wagered, game credits, an amount won, an amount lost, a time, a date, a game name, a location, player tracking information, random numbers generated, a game pay table, a game denomination, a first device identifier, and player identification information.

18. The method of claim 1 further comprising generating a frame signature for inclusion in the first frame data, the frame signature unambiguously identifying the first frame data.

19. The method of claim 18 wherein the frame signature comprises at least one of a CRC, a checksum and a hash value, the at least one of the CRC, the checksum, and the hash value being determined with reference to a portion of the first frame data.

20. The method of claim 1 further comprising generating the first frame data, wherein the first frame data corresponds to a visual representation which includes the game presentation actual frame and is capable of being displayed on a multimedia display, the visual representation also including a visible authentication object.

21. The method of claim 20 wherein the visible authentication object comprises at least one of date, time, serialized game number, paytable number, user id, machine serial number, current progressive values, host id, network id, and casino water mark.

22. The method of claim 1 wherein the network comprises any of a telecommunications network, a phone network, a wireless network, a satellite network, a cable network, a local area network, and a wide area network.

23. The method of claim 1 wherein execution of the game of chance is facilitated according to a client-server model.

24. The method of claim 1 wherein execution of the game of chance is facilitated according to a peer-to-peer model.

25. A computer program product comprising at least one computer-readable medium having computer program instructions stored therein which are operable to cause at least one computer to capture and present a game history for a game of chance played on a device, the computer program instructions comprising:

first instructions for facilitating execution of a game of chance on a device in a network, the execution causing generation of a plurality of game presentation actual frames capable of being presented on a multimedia display of a first device, wherein at least one selected game presentation actual frame is a frame generated and stored in a frame buffer of the first device for presentation on the multimedia display of the first device when the game of chance is executed on the device;

second instructions for receiving first frame data from the first device via the network when the game of chance is executed, the first frame data representing at least a portion of the game history and including a selected one of the game presentation frames;

third instruction for capturing the at least one selected game presentation actual frame of the game presentation actual frames when the game of chance is executed on the first device;

fourth instruction for storing the first frame data after receiving the first frame data; and fifth instruction for displaying the first frame data, thereby effectively presenting the game history for the game of chance.

26. The computer program product of claim 25 wherein the first instructions comprise instructions for receiving a request from the first device identifying the game of chance, and instructions for collaboratively executing the game of chance with the first device.

27. The computer program product of claim 26 wherein the instructions for collaboratively executing the same comprise instructions for executing game flow logic on a host device, and instructions for executing game presentation logic on the first device.

28. The computer program product of claim 25, further comprising: instructions for selecting the selected game presentation actual frame from a frame buffer in the first device.

29. The computer program product of claim 25, further comprising: instructions for capturing the selected game presentation actual frame directly from the display of the first device.

30. The computer program product of claim 25, further comprising: instructions for detecting an event which triggers capture of the selected game presentation actual frame.

31. The computer program product of claim 30 wherein the event corresponds to an outcome of the game of chance.

32. The computer program product of claim 25, further comprising: instructions for uploading at least one software module to the first device which is operable to capture the selected game presentation actual frame.

33. The computer program product of claim 25, further comprising: instructions for transmitting a capture command to the first device.

34. The computer program product of claim 25 further comprising instructions for generating the first frame data.

35. The computer program product of claim 34, further comprising one or more of the following: instructions for compressing the selected game presentation actual frame, instructions for encrypting the selected game presentation actual frame, and instructions for reducing color information in the game presentation actual frame.

36. The computer program product of claim 34, further comprising: instructions for capturing additional data and associating the additional data with the selected game presentation actual frame.

37. The computer program product of claim 36 wherein the additional data include any of an amount wagered, game credits, an amount won, an amount lost, a time, a date, a game name, a location, player tracking information, random numbers generated, a game pay table, a game denomination, a first device identifier, and player identification information.

38. The computer program product of claim 25 further comprising instructions for rendering the first frame data.

39. The computer program product of claim 38, further comprising: instructions for generating a visual representation of the first frame data which includes the game presentation actual frame.

40. The computer program product of claim 25 further comprising third instructions for independently generating second frame data corresponding to the selected game presentation actual frame.

41. The computer program product of claim 40 further comprising instructions for comparing the first frame data with the second frame data.

42. The computer program product of claim 41, further comprising: instructions for rendering visual representations of the first frame data and the second frame data.

43. The computer program product of claim 40 wherein the second frame data comprises a duplicate game presentation actual frame corresponding to the selected game presentation actual frame.

44. The computer program product of claim 43 wherein the second frame data further comprises one or more of the following: an amount wagered, game credits, an amount won, an amount lost, a time, a date, a game name, a location, player tracking information, random numbers generated, a game pay table, a game denomination, a first device identifier, and player identification information.

45. The computer program product of claim 25 further comprising instructions for generating a frame signature for inclusion in the first frame data, the frame signature unambiguously identifying the first frame data.

46. The computer program product of claim 45 wherein the frame signature comprises at least one of a CRC, a checksum and a hash value, the at least one of the CRC, the checksum, and the hash value being determined with reference to a portion of the first frame data.

47. The computer program product of claim 25 further comprising instructions for generating the first frame data, wherein the first frame data corresponds to a visual representation which includes the game presentation actual frame and is capable of being displayed on a multimedia display, the visual representation also including a visible authentication object.

48. The computer program product of claim 47 wherein the visible authentication object comprises at least one of date, time, serialized game number, paytable number, user id, machine serial number, current progressive values, host id, network id, and casino water mark.

49. The computer program product of claim 25 wherein the network comprises any of a telecommunications network, a phone network, a wireless network, a satellite network, a cable network, a local area network, and a wide area network.

50. The computer program product of claim 25 wherein the first instructions are operable to facilitate execution of the game of chance according to a client-server model.

51. The computer program product of claim 25 wherein the first instructions are operable to facilitate execution of the game of chance according to a peer-to-peer model.

52. A gaming system, comprising:

a plurality of gaming machines, each gaming machine comprising a network interface and a master gaming controller operable: to control a game of chance played on the gaming machine, to generate a sequence of game presentation actual frames for use in a video game presentation of the game of chance, to select one or more game presentation actual frames from the sequence of game presentation actual frames stored in one or more frame buffers of said plurality of gaming machines, to capture the one or more game presentation actual frames, to store the one or more game presentation actual frames and to incorporate frame data from the selected game presentation actual frames into one or more game history frames, and display the one or more game history frames to effectively provide a game history of the game of chance, wherein each gaming machine is further operable to receive cash or indicia of credit for a wager on the game of chance, and to output cash or an indicia of credit as an award for the game of chance;

a network interconnecting the plurality of gaming machines via the corresponding network interfaces; and at least one server coupled to the network and operable to store the game history frames from the plurality of gaming machines.

53. The gaming system of claim 52 wherein each gaming machine further comprises non-volatile memory for storing the one or more game history frames.

54. The gaming system of claim 52 wherein each gaming machine further comprises a camera used to record a player image from a player being presented the game presentation on the gaming machine.

55. The gaming system of claim 54 wherein the master gaming controller is further operable to incorporate the player image into the one or more game history frames.

56. The gaming system of claim 52 wherein the master gaming controller is further operable to incorporate game history information into the one or more game history frames.

57. The gaming system of claim 52 wherein the video game presentation comprises any of a video slot game presentation, a video keno game presentation, a video poker game presentation, a video pachinko game presentation, and a video black jack game presentation.

58. The gaming system of claim 52 wherein each gaming machine further comprises a printer operable to print the one or more game history frames.

59. The gaming system of claim 52 wherein each gaming machine further comprises a display device operable to display the one or more game history frames.

60. The gaming system of claim 52 further comprising a printer coupled to the network which is operable to print the game history frames from the plurality of gaming machines.

61. The gaming system of claim 52 further comprising a display device coupled to the network which is operable to display the game history frames from the plurality of gaming machines.

62. The gaming system of claim 52 wherein the at least one server is further operable to generate promotional information based on the at least one of the game history frames from the plurality of gaming machines.

63. The gaming system of claim 62 wherein the at least one server is further operable to cause a representation of the promotional information to be displayed on any of the gaming machines.

64. The gaming system of claim 52 wherein the at least one server is further operable to facilitate dispute resolution with reference to the game history frames from the plurality of gaming machines.

65. The gaming system of claim 52 wherein the at least one server is further operable to facilitate a bonusing game with reference to at least one of the game history frames from the plurality of gaming machines.

66. The gaming system of claim 65 wherein the bonusing game can be played on a subset of the gaming machines.

67. The gaming system of claim 52 wherein the at least one server is further operable to cause a game history frame generated by a first one of the gaming machines to be displayed on a second one of the gaming machines.

68. A computer-implemented method for capturing and presenting a game history for a game of chance played using a device, comprising:

facilitating execution of a game of chance on a first device, the execution causing generation of a plurality of game presentation actual frames capable of being presented on a multimedia display of a first device;

facilitating capture of a sequence of actual frames of the plurality of game presentation actual frames stored in a frame buffer of the device when the game of chance is executed on the first device, wherein the sequence of the actual frames is a sequence of frames actually generated for presentation on the multimedia display of the first device when the game of chance is played on the first device;

receiving first frame data from the first device, the first frame data representing at least a portion of the game history and including the sequence of the game presentation actual frames; and displaying the sequence of the game presentation actual frame, thereby effectively providing a game history of the game of chance.

69. The method of claim 68 further comprising replaying the sequence of game presentation actual frames thereby displaying the portion of the game history.

70. The method of claim 69 wherein replaying the sequence of game presentation actual frames comprises displaying a video representation of the portion of the game history.

71. The method of claim 70 wherein the video representation is encoded according to any of an MPEG standard, a DVD standard, a VCR standard.

72. A gaming device comprising one or more processors configured and/or operable to:

execute a game;

generate a plurality of game presentation actual frames for the game when the game is being executed, wherein the game presentation actual frames are capable of being presented in connection with the game on a display associated and/or configured for the gaming device;

store the plurality of game presentation actual frames in at least one frame buffer provided for the gaming device:

capture from the frame buffer at least one game presentation actual frame from the plurality of the game presentation actual frames as at least one captured game frame when the game is executed, wherein the at least one captured game frame is a frame actually generated for presentation on the display when the game is executed; and provide the at least one captured game frame for display on the display and/or another display, thereby allowing a game history of the game to be presented.

73. The gaming device as recited in claim 72, wherein the gaming device is further configured and/or operable to:

send the captured game frame to another device for display on the other display.

74. The gaming device as recited in claim 73, wherein the device is further configured and/or operable to:

receive a command and/or indication from the other device in order to initiate the capturing of the at least one captured game frame.

75. The gaming device as recited in claim 72, wherein said game is a game of chance.

76. The gaming device as recited in claim 75, wherein the capturing of the at least one captured game frame is triggered as the result of the outcome of the game of chance.

* * * * *